(12) United States Patent
Tsai

(10) Patent No.: US 10,267,432 B2
(45) Date of Patent: Apr. 23, 2019

(54) DISPLAY DEVICE OF FAUCET

(71) Applicant: AGREAT SHOWER & SANITARY (XIAMEN) CO., LTD., Xiamen, Fujian Province (CN)

(72) Inventor: Pi Kuang Tsai, Xiamen (CN)

(73) Assignee: AGREAT SHOWER & SANITARY (XIAMEN) CO., LTD., Xiamen, Fujian (CN)

( * ) Notice: Subject to any disclaimer, the term of this patent is extended or adjusted under 35 U.S.C. 154(b) by 0 days.

(21) Appl. No.: 15/986,814

(22) Filed: May 23, 2018

(65) Prior Publication Data

US 2018/0340629 A1 Nov. 29, 2018

(30) Foreign Application Priority Data

May 26, 2017 (TW) .............................. 106207660 U

(51) Int. Cl.
*F16K 37/00* (2006.01)
*G01K 13/02* (2006.01)
*E03C 1/04* (2006.01)
*G01K 1/14* (2006.01)
*G01K 1/02* (2006.01)

(52) U.S. Cl.
CPC .............. *F16K 37/005* (2013.01); *E03C 1/04* (2013.01); *G01K 1/028* (2013.01); *G01K 1/14* (2013.01); *G01K 13/02* (2013.01); *E03C 2001/0418* (2013.01); *G01K 2013/026* (2013.01)

(58) Field of Classification Search
CPC ......... F16K 37/005; F03C 1/04; G01K 1/028; G01K 1/14; G01K 13/02; E03C 1/04; E03C 1/055; E03C 1/057; E03C 2001/0418; Y10T 137/8158
See application file for complete search history.

(56) References Cited

U.S. PATENT DOCUMENTS

| | | | | |
|---|---|---|---|---|
| 5,924,449 A | * | 7/1999 | Enoki ....................... | E03C 1/04 137/454.5 |
| 5,979,776 A | * | 11/1999 | Williams ............ | G05D 23/1393 236/12.12 |
| 6,056,201 A | * | 5/2000 | Ta ...................... | G05D 23/1393 137/625.4 |
| 6,438,770 B1 | * | 8/2002 | Hed .......................... | E03C 1/05 236/12.12 |

(Continued)

*Primary Examiner* — Orlando Bousono
(74) *Attorney, Agent, or Firm* — Leong C. Lei

(57) ABSTRACT

A display device is arranged in a faucet at a temperature detection zone to detect a temperature of water flowing therethrough and includes a sealing housing formed therein with an upper receiving space and a lower receiving space in communication with each other and having a bottom having a discharge hole extending therethrough; a circuit board arranged in the upper receiving space; a display module electrically connected with the circuit board; a temperature detection unit electrically connected with the circuit board and partly exposed outside the sealing housing; a hydraulic power generation module arranged in the lower receiving space and electrically connected with the circuit board, the display module, and the temperature detection unit; and a bottom cover fit to the bottom of the sealing housing in a manner of not covering the discharge hole and having a lower opening for entry of the mixture warm water.

11 Claims, 14 Drawing Sheets

(56) References Cited

U.S. PATENT DOCUMENTS

| Patent/Pub. No. | Date | Inventor | Class |
|---|---|---|---|
| 7,174,579 B1* | 2/2007 | Bauza | E03C 1/055 374/148 |
| 7,252,431 B1* | 8/2007 | Caramanna | G01K 1/14 116/216 |
| 7,806,134 B1* | 10/2010 | Chang | G05D 23/1313 137/100 |
| 7,934,662 B1* | 5/2011 | Jenkins | G05D 23/1326 236/12.1 |
| 8,316,883 B1* | 11/2012 | Watson | E03C 1/0404 137/315.12 |
| 2002/0134847 A1* | 9/2002 | Brooks | E03C 1/05 236/12.12 |
| 2002/0144341 A1* | 10/2002 | Zieger | E03C 1/021 4/605 |
| 2003/0125842 A1* | 7/2003 | Chang | E03C 1/0409 700/282 |
| 2003/0151552 A1* | 8/2003 | Ilq | B60R 25/24 342/374 |
| 2004/0032749 A1* | 2/2004 | Schindler | E03C 1/0412 362/555 |
| 2004/0258567 A1* | 12/2004 | Kokin | E03C 1/0404 422/68.1 |
| 2005/0004712 A1* | 1/2005 | Stevens | G05D 23/1393 700/266 |
| 2005/0103895 A1* | 5/2005 | Fujii | E03C 1/0408 239/407 |
| 2005/0133100 A1* | 6/2005 | Bolderheij | E03C 1/04 137/801 |
| 2007/0108400 A1* | 5/2007 | Johnson | E03C 1/0401 251/129.04 |
| 2007/0204925 A1* | 9/2007 | Bolderheij | E03C 1/04 137/801 |
| 2008/0110502 A1* | 5/2008 | Oh | E03C 1/023 137/119.05 |
| 2008/0189850 A1* | 8/2008 | Seggio | E03C 1/05 4/623 |
| 2008/0235865 A1* | 10/2008 | Smushkovich | E03C 1/242 4/679 |
| 2008/0271238 A1* | 11/2008 | Reeder | A46B 7/04 4/597 |
| 2009/0000024 A1* | 1/2009 | Louis | E03C 1/046 4/676 |
| 2009/0106891 A1* | 4/2009 | Klicpera | B05B 12/004 4/605 |
| 2009/0119832 A1* | 5/2009 | Conroy | E03C 1/05 4/623 |
| 2009/0272445 A1* | 11/2009 | Shimizu | E03C 1/0404 137/801 |
| 2009/0293189 A1* | 12/2009 | Somerville | B05B 1/18 4/597 |
| 2009/0314358 A1* | 12/2009 | Stimpson | E03C 1/041 137/341 |
| 2010/0327198 A1* | 12/2010 | Lang | E03C 1/055 251/129.05 |
| 2011/0031331 A1* | 2/2011 | Klicpera | B05B 12/008 239/71 |
| 2011/0068192 A1* | 3/2011 | Klicpera | B05B 12/004 239/74 |
| 2011/0120574 A1* | 5/2011 | Chen | G05D 23/1393 137/468 |
| 2011/0178644 A1* | 7/2011 | Picton | E03B 7/071 700/282 |
| 2011/0185493 A1* | 8/2011 | Chen | E03C 1/057 4/623 |
| 2011/0186154 A1* | 8/2011 | Klicpera | B67D 7/08 137/551 |
| 2011/0186642 A1* | 8/2011 | Hsieh | G05D 23/13 236/12.1 |
| 2011/0259454 A1* | 10/2011 | Tsai | E03C 1/0408 137/565.17 |
| 2012/0017367 A1* | 1/2012 | Reeder | E03C 1/055 4/597 |
| 2012/0038482 A1* | 2/2012 | Lee | E03C 1/041 340/584 |
| 2012/0234409 A1* | 9/2012 | Klicpera | B05B 12/004 137/551 |
| 2012/0255116 A1* | 10/2012 | Houghton | G05D 23/1393 4/623 |
| 2012/0305457 A1* | 12/2012 | Yao | C02F 1/003 210/85 |
| 2013/0062422 A1* | 3/2013 | Marty | E03C 1/057 236/12.16 |
| 2013/0075483 A1* | 3/2013 | Marty | E03C 1/057 236/12.1 |
| 2013/0168583 A1* | 7/2013 | Zhou | B05B 1/18 251/129.01 |
| 2013/0233387 A1* | 9/2013 | Bedolla | E03C 1/055 137/1 |
| 2013/0239321 A1* | 9/2013 | Reeder | E03C 1/055 4/615 |
| 2013/0269786 A1* | 10/2013 | Song | E03C 1/057 137/2 |
| 2013/0299016 A1* | 11/2013 | Lee | E03C 1/04 137/551 |
| 2013/0312856 A1* | 11/2013 | Huffington | F16K 37/00 137/557 |
| 2014/0029293 A1* | 1/2014 | Zhang | F21V 33/004 362/602 |
| 2014/0261749 A1* | 9/2014 | Chen | E03C 1/057 137/78.1 |
| 2015/0040997 A1* | 2/2015 | Blake | E03C 1/057 137/315.03 |
| 2015/0114474 A1* | 4/2015 | Bedolla | E03C 1/055 137/1 |
| 2015/0221206 A1* | 8/2015 | Schneider, II | G08B 5/36 340/584 |
| 2015/0224525 A1* | 8/2015 | Klicpera | B05B 1/18 4/615 |
| 2015/0247307 A1* | 9/2015 | Reeder | E03C 1/055 4/601 |
| 2015/0376880 A1* | 12/2015 | Chen | E03C 1/057 4/668 |
| 2016/0032572 A1* | 2/2016 | Chen | E03C 1/057 137/78.1 |
| 2016/0208465 A1* | 7/2016 | Evans | E03C 1/0404 |
| 2016/0258144 A1* | 9/2016 | Tayenaka | E03C 1/025 |
| 2016/0340879 A1* | 11/2016 | Chen | E03C 1/057 |
| 2016/0378322 A1* | 12/2016 | Klicpera | G06F 3/04847 715/773 |
| 2017/0065988 A1* | 3/2017 | Huang | G01K 11/12 |
| 2017/0132885 A1* | 5/2017 | Schneider | G08B 5/36 |
| 2017/0218608 A1* | 8/2017 | Chen | E03C 1/057 |
| 2017/0342691 A1* | 11/2017 | Yan | E03C 1/057 |
| 2018/0179743 A1* | 6/2018 | Tang | E03C 1/044 |
| 2018/0364087 A1* | 12/2018 | Geller | E03B 1/00 |

* cited by examiner

DISPLAY DEVICE OF FAUCET

TECHNICAL FIELD OF THE INVENTION

The present invention relates generally to a faucet, and more particularly to a display device of a faucet.

DESCRIPTION OF THE PRIOR ART

The progress of material life and change of shower habit make bring significant change of shower devices as compared to the early days. One of the examples is a faucet. In the early days, people are used to bath by immersing the body in water. Bath tubs are then commonly used, but bathing with a bath tub consumes a large amount of water. To suit the trend of saving water, showering gradually replace bathing with a bath tub. Showering is generally carried out with a shower head that is the primary tool for showering. Most the bathroom faucets that are currently Available in the market are equipped with a shower head and also have the feature of bidirectional temperature regulation function, which is generally done with hot and cold knobs provided on the faucet in order to control the temperature of water sprinkled from the shower head. The known temperature-controllable faucets, however, are not perfect. For example, a user may not directly shower immediately after water sprinkled from the shower head because the user can only adjust the temperature by rotating the hot and cold knobs, but is not aware of the actual temperature of water sprinkled from the shower head. In consideration of the fact that the water temperature is not actually known, and also for the purpose of protection and safety, the user has to use a hand to touch and sense the temperature of the water dispensed from the shower head and showering can only be started after a moderate temperature of water has been confirmed. This cause waste of a large amount of water and also time and effort in carrying out the operation of sensing and identifying water temperature.

Taiwan Utility Model 234497 discloses a temperature display for use in a temperature-adjustable faucet, in which a coupling ring is provided on a water outlet of a shower head of the temperature-adjustable faucet. The coupling ring is provided with a temperature sensor bar and the temperature sensor bar is connected to a display unit. The coupling ring is coupled to a water pipe of the shower head so that when water supplied to the faucet is dispensed through the shower head, the temperature sensor bar may detect the temperature of the water and displaying of the temperature is made on the display unit. The display unit is also set such that alarm sounding is given off when the temperature of water exceeds a threshold, in order to help a shower user to control and adjust the water temperature.

The temperature display of the known temperature-adjustable faucet is externally attached to the temperature-adjustable faucet. Since the faucet is set up in an environment that is generally full of moisture and liquid, invasion of water into the display device that is exposed may readily cause short-circuiting. Further, being mounted externally of the faucet, the display device most be installed or mounted on a wall surface at a location close to or around the temperature-adjustable faucet. This would cause damage or local destruction to the structure and aesthetics of the wall. In case that replacement is desired, professional people must be retained for handling and additional damage of the wall would occur.

SUMMARY OF THE INVENTION

To overcome the technical deficiency of the prior art, the present invention provides a display device of a faucet, which is operable to not only display a temperature of a mixture of water but also allow easy and simple removal and replacement from the faucet, so that when the detected temperature display device is broken, replacement can be done easy by a user to thereby reduce the labor cost of plumbers.

Another objective of the present invention is to provide a display device of a faucet, which comprises a protection module such that the protection module is provided to prevent short-circuiting of a circuit board due to invasion of moisture or liquid into a temperature detection zone, thereby providing an effect of water resistance.

To achieve the above objectives, the present invention provides a display device for use with a faucet, which is arranged in the faucet at a temperature detection zone to detect a temperature of mixture warm water flowing through the temperature detection zone. The display device comprises: a sealing housing, which comprises, formed therein, an upper receiving space and a lower receiving space in communication with each other, the sealing housing having a bottom that is formed with a discharge hole extending therethrough; a circuit board, which is arranged in the upper receiving space; a display module, which is electrically connected with the circuit board and is located on the circuit board; a temperature detection unit, which is electrically connected with the circuit board and is partly exposed outside the sealing housing; a hydraulic power generation module, which is arranged in the lower receiving space and is electrically connected with the circuit board, the display module, and the temperature detection unit; and a bottom cover, which is fit to the bottom of the sealing housing in a manner of not covering the discharge hole, the bottom cover comprising a lower opening for entry of the mixture warm water.

In some embodiments, the hydraulic power generation module comprises a body, a rotary spindle, and a fan, the rotary spindle being arranged to extend along a central axis of the body, the fan having a central axle that is coupled, through a sphere, to a lower end of the rotary spindle, the fan being driven by a flow of the mixture warm water to rotate so that the fan drives the rotary spindle and the body to rotate for generation of electrical power.

In some embodiments, the bottom cover comprises a cover body and a fitting ring, the lower opening being formed in and extending through a bottom of the cover body, the fitting ring being fit outside the cover body.

In some embodiments, the display device for use with the faucet further comprises a protection module, which is mounted, in a removable manner, to the faucet to be set on and covering the sealing housing, the protection module comprising a water-resistant lid, a frame cover, a retention cover, and a sealing ring, the water-resistant lid being set on and covering the sealing housing and comprising a transparent raised portion having a shape and size corresponding to the display module and arranged at location corresponding to the display module, the frame cover being mounted on the water-resistant lid and comprising a window corresponding to the transparent raised portion to receive, as being accommodated therein, projection of the transparent raised portion, the retention cover being set on and covering the frame cover and being mounted, in a removable manner, to the faucet, the retention cover having a configuration of a hollow ring so as to expose the transparent raised portion and the window and allow for observation of the display module.

In some embodiments, the faucet comprises a hot water inlet opening, a cold water inlet opening, a hot water flow channel, a cold water flow channel, a mixture warm water flow channel, the temperature detection zone, and a water outlet opening, wherein the hot water inlet opening is in communication with the hot water flow channel; the cold water inlet opening is in communication with the cold water flow channel; the hot water flow channel is isolated from the cold water flow channel; an end of the hot water flow channel that is distant from the hot water inlet opening and an end of the cold water flow channel that is distant from the cold water inlet opening are both in communication with the mixture warm water flow channel; the mixture warm water flow channel is also in communication with the lower opening formed in the bottom cover of temperature-detection display device that is arranged in the temperature detection zone; the mixture warm water flows through the lower opening of the bottom cover to be discharged through the discharge hole; the mixture warm water flows through a part of the temperature detection unit that is located outside the sealing housing of the temperature detection zone so that the temperature detection unit detects the temperature of the mixture warm water that is applied to the circuit board for signal processing; the processed signal is transmitted from the circuit board to the display module, so that the display module displays the temperature of the water.

The present invention also provides a display device for use with a faucet, which is arranged in a faucet at a temperature detection zone and generally comprises: a sealing housing, which comprises, formed therein, an upper receiving space and a lower receiving space in communication with each other, the sealing housing having a bottom that is formed with a discharge hole extending therethrough; a circuit board, which is arranged in the upper receiving space; a display module, which comprises at least one light-emitting diode and is electrically connected with the circuit board and located on the circuit board; a hydraulic power generation module, which is arranged in the lower receiving space and is electrically connected with the circuit board and the display module to generate electrical power as being driven by a water flow inside the temperature detection zone to supply the electrical power to energize the light-emitting diode for emission of light; a bottom cover, which is fit to the bottom of the sealing housing in a manner of not covering the discharge hole, the bottom cover comprising a lower opening for entry of water; a protection module, which comprises a water-resistant lid, the water-resistant lid being set on and covering the sealing housing and comprising a light transmitting section at a location corresponding to the display module, the light transmitting section being light transmitting, the light transmitting section comprising a display target formed thereon such that the display target is irradiated by lighting from the light emitting diode.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
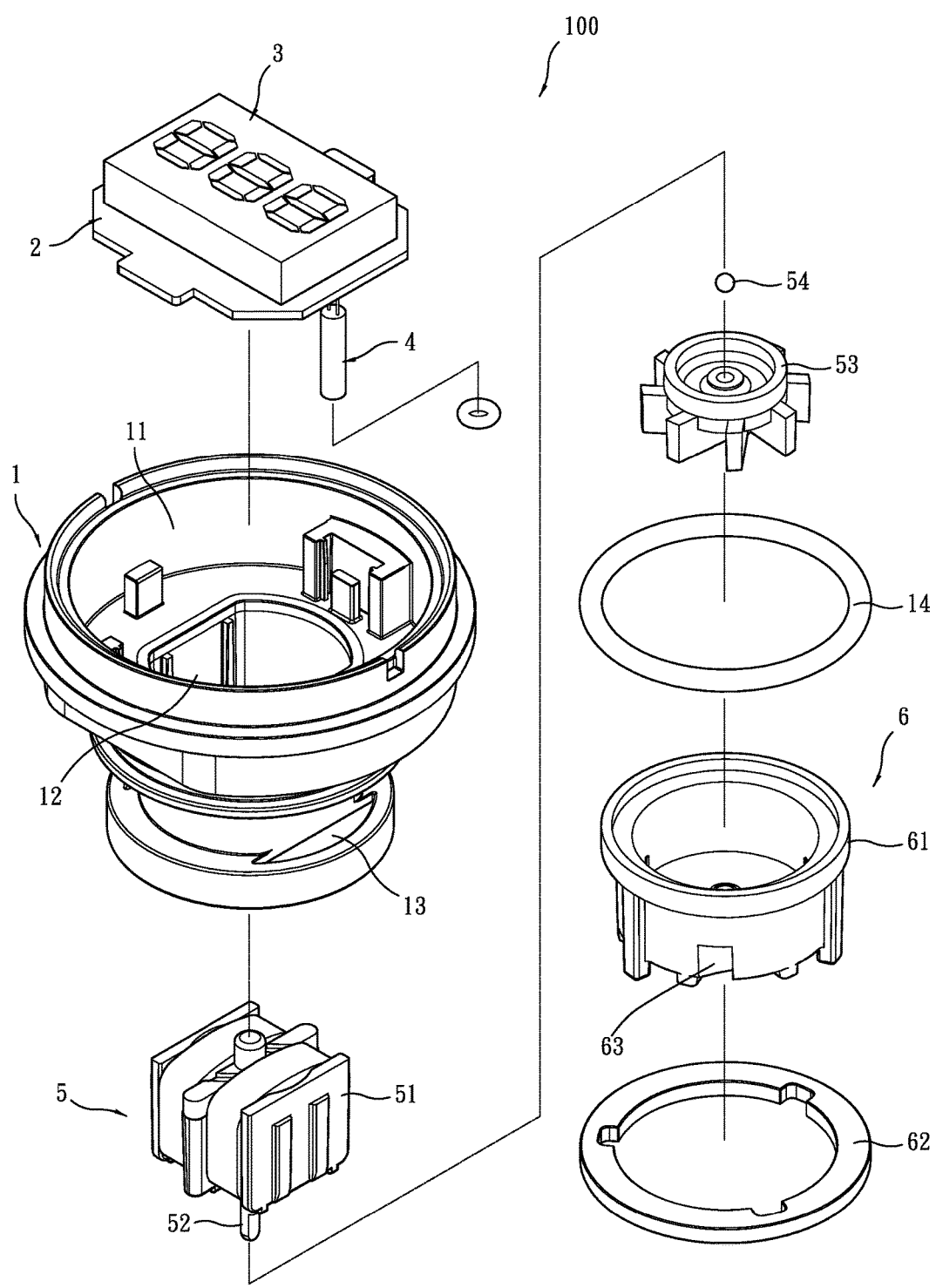
FIG. 1 is an exploded view showing a first embodiment of the present invention.
Figure 2:
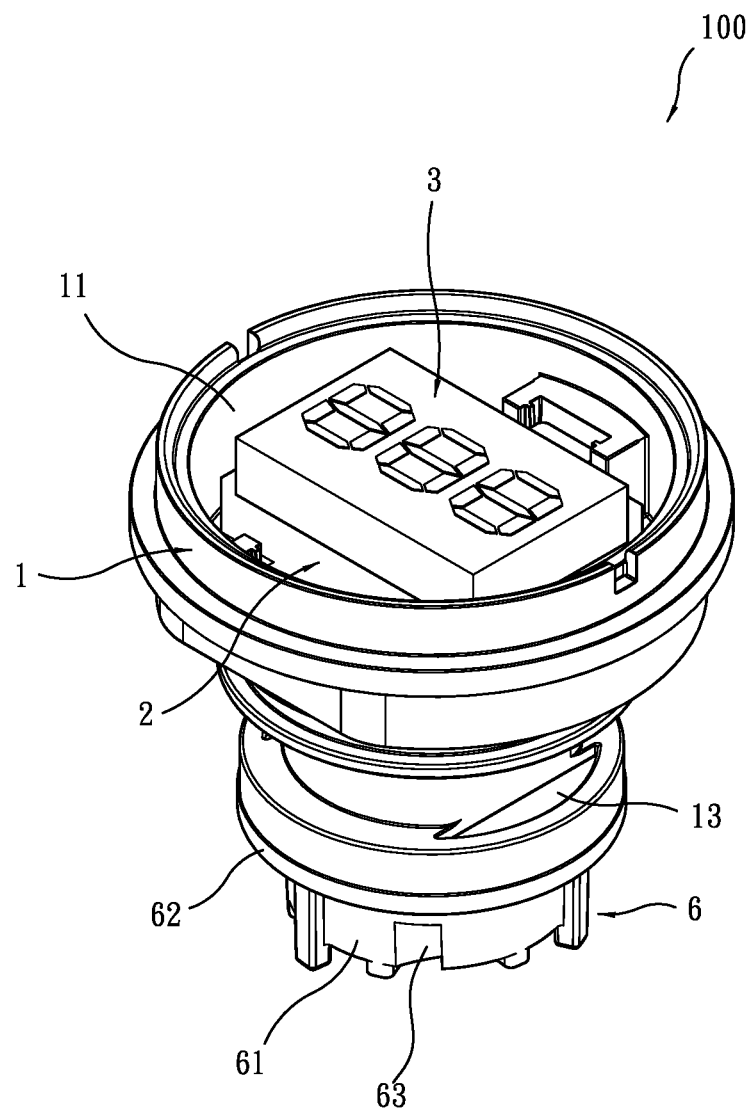
FIG. 2 is a perspective view showing the first embodiment of the present invention.
Figure 3:
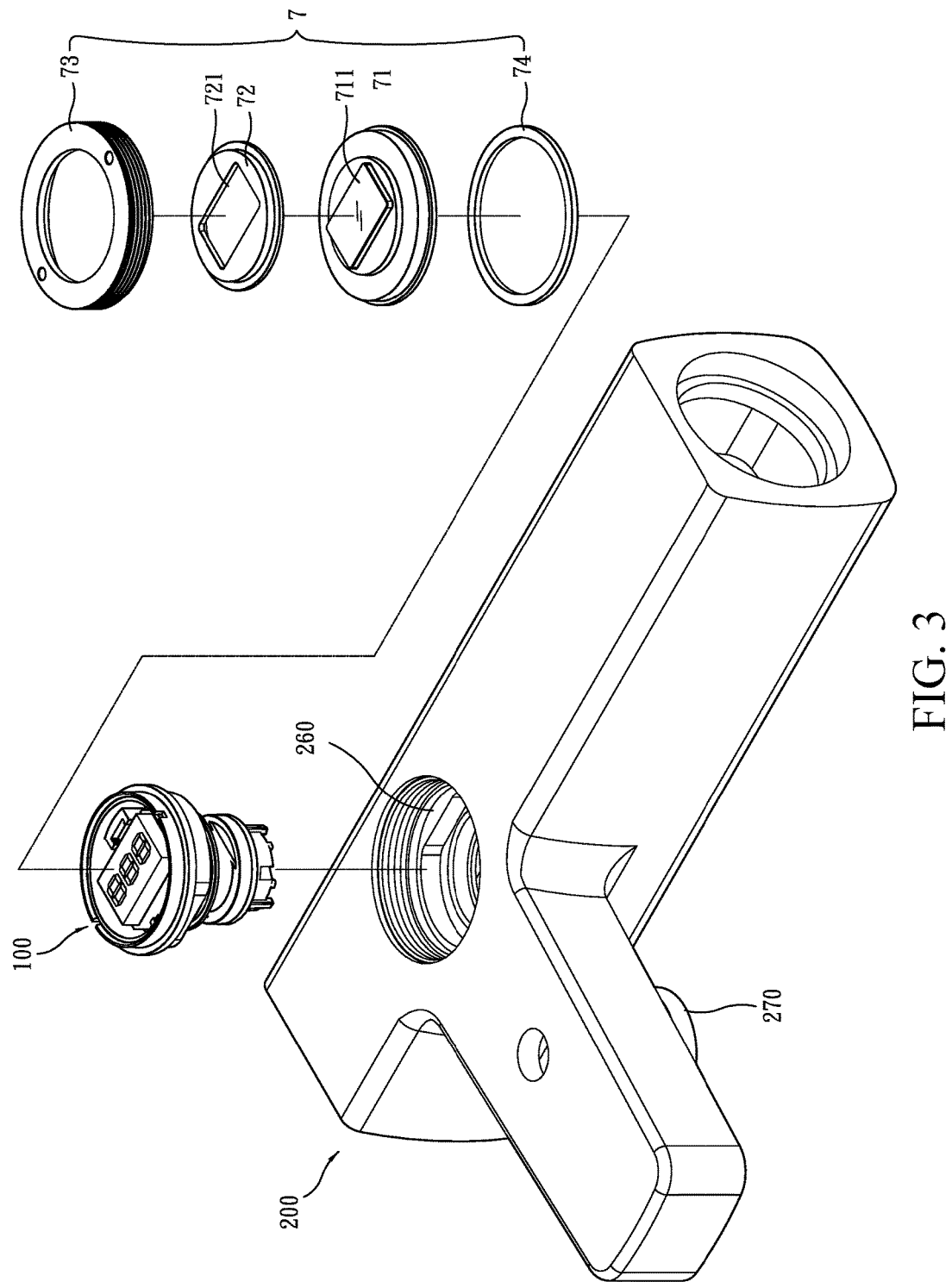
FIG. 3 is an exploded view showing the first embodiment of the present invention, in combination with a faucet.
Figure 4:
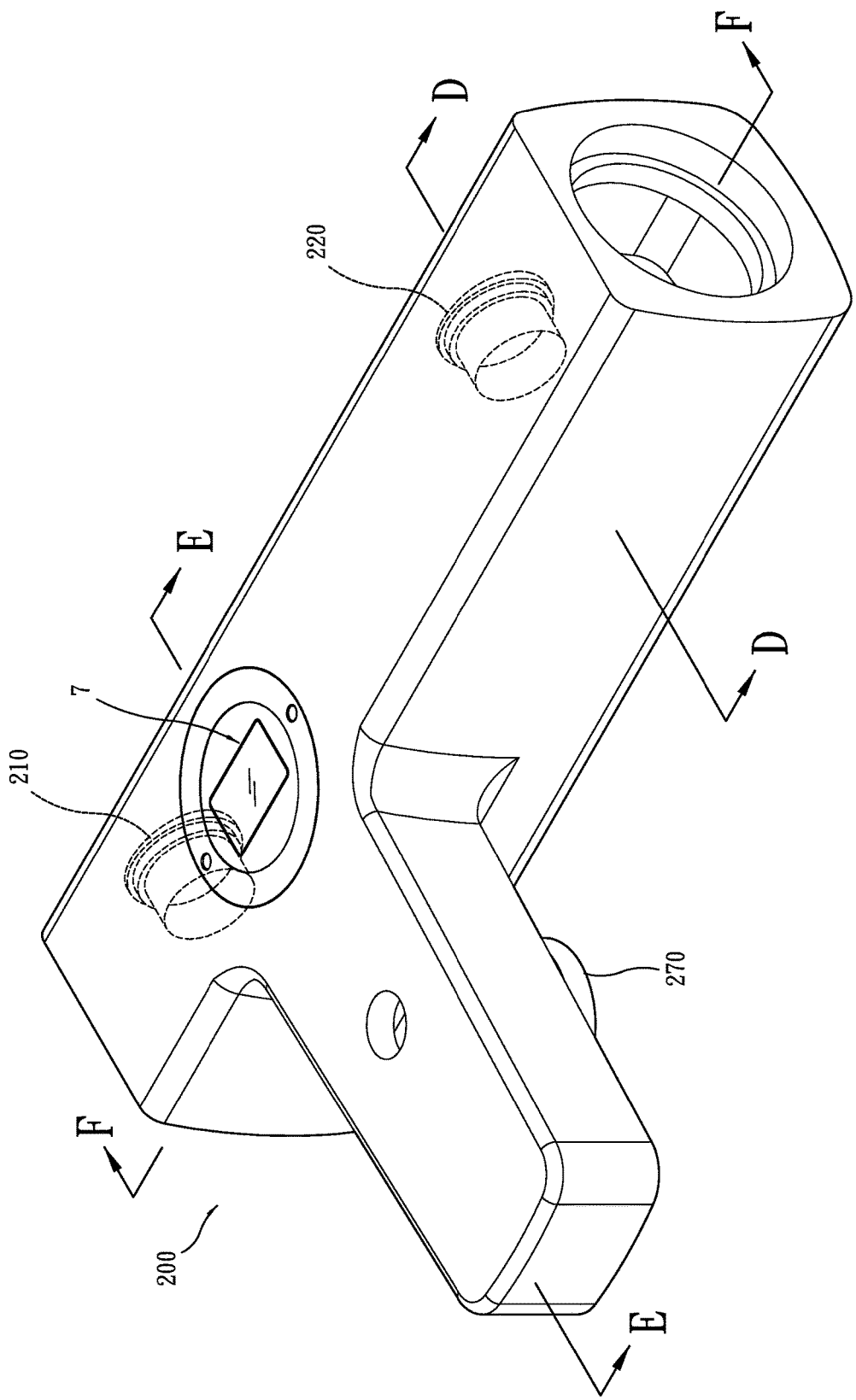
FIG. 4 is a perspective view showing the first embodiment of the present invention in combination with the faucet.
Figure 5:
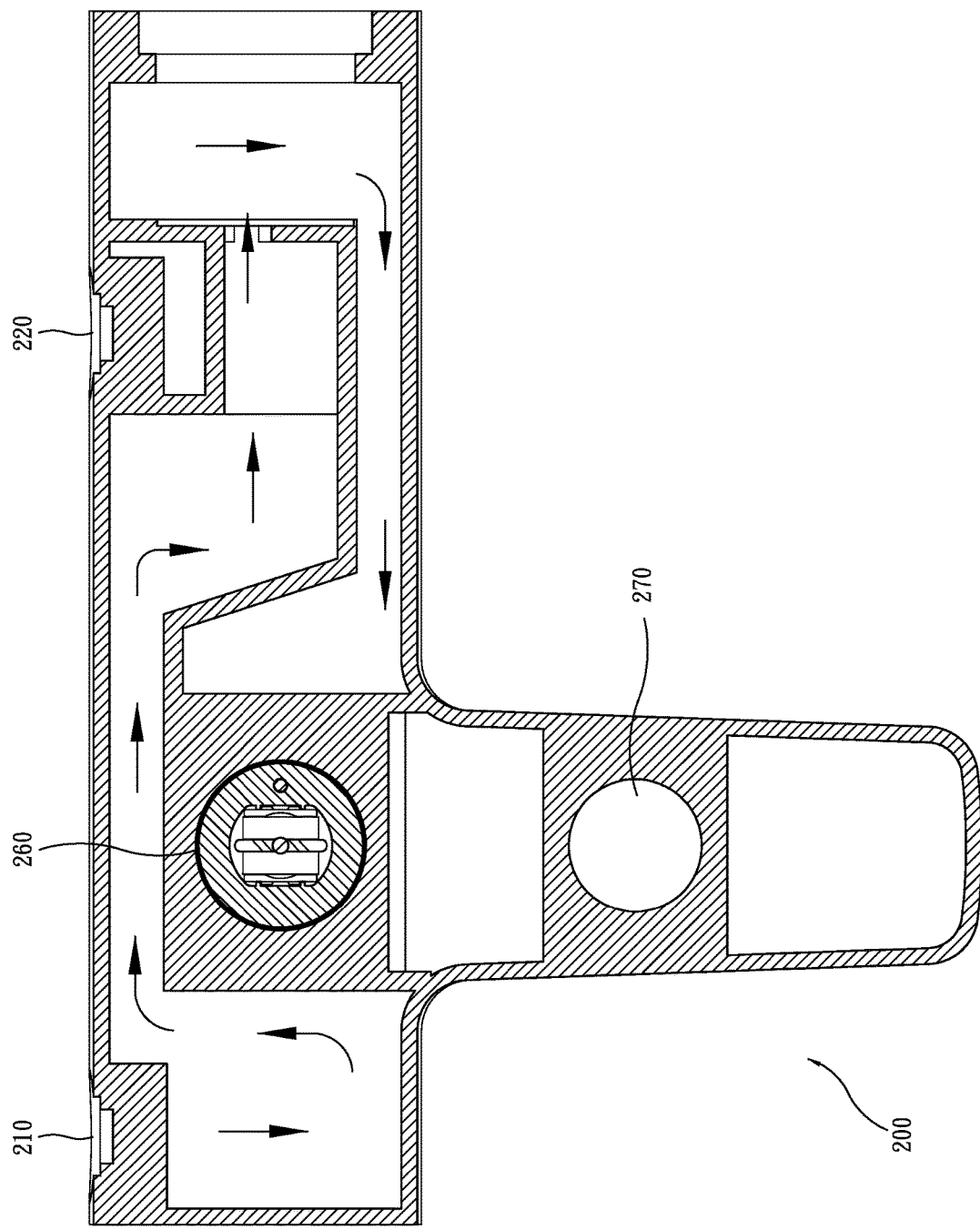
FIG. 5 is a cross-sectional view taken along line A-A of FIG. 10.
Figure 6:
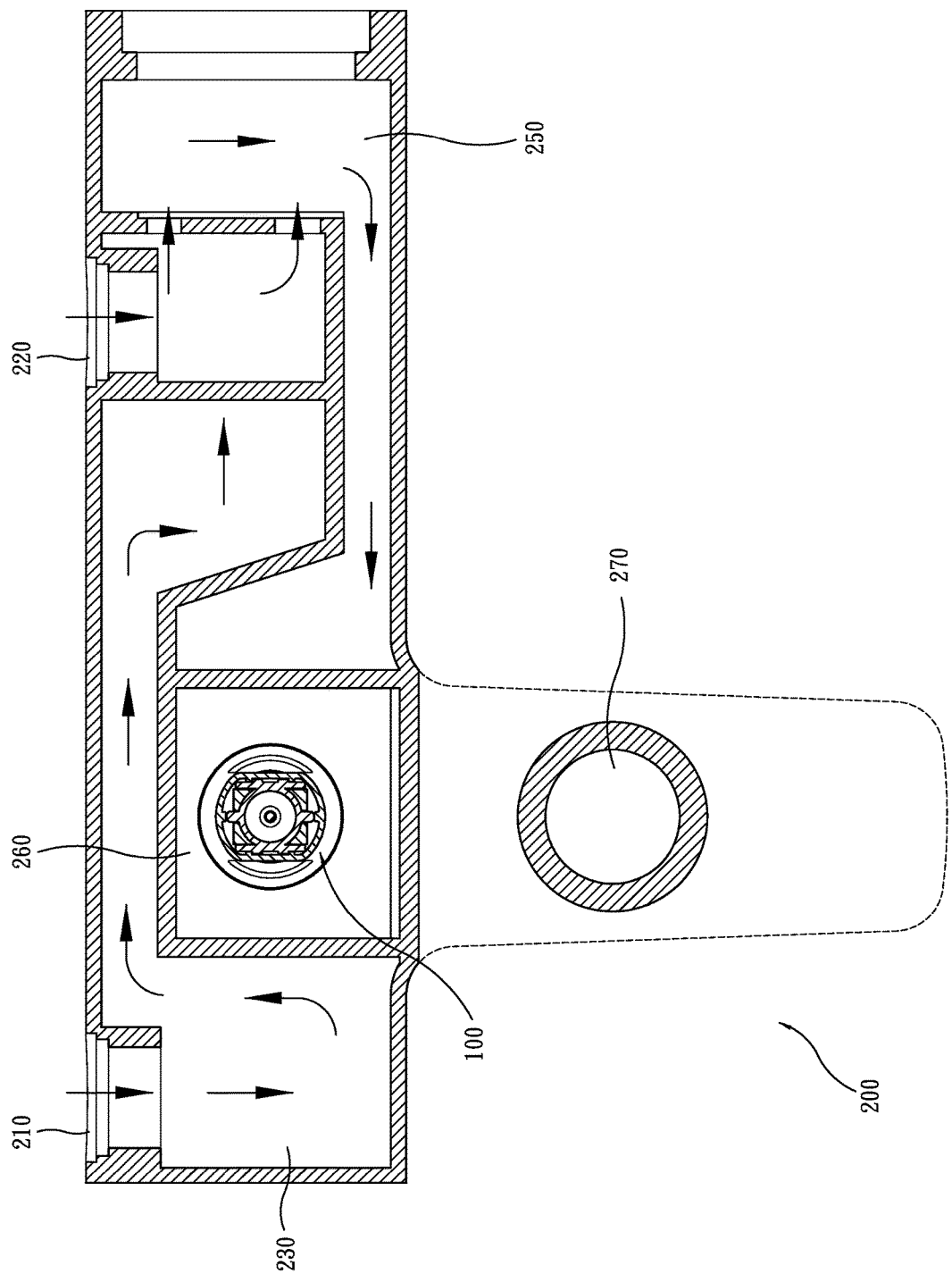
FIG. 6 is a cross-sectional view taken along line B-B of FIG. 10.
Figure 7:
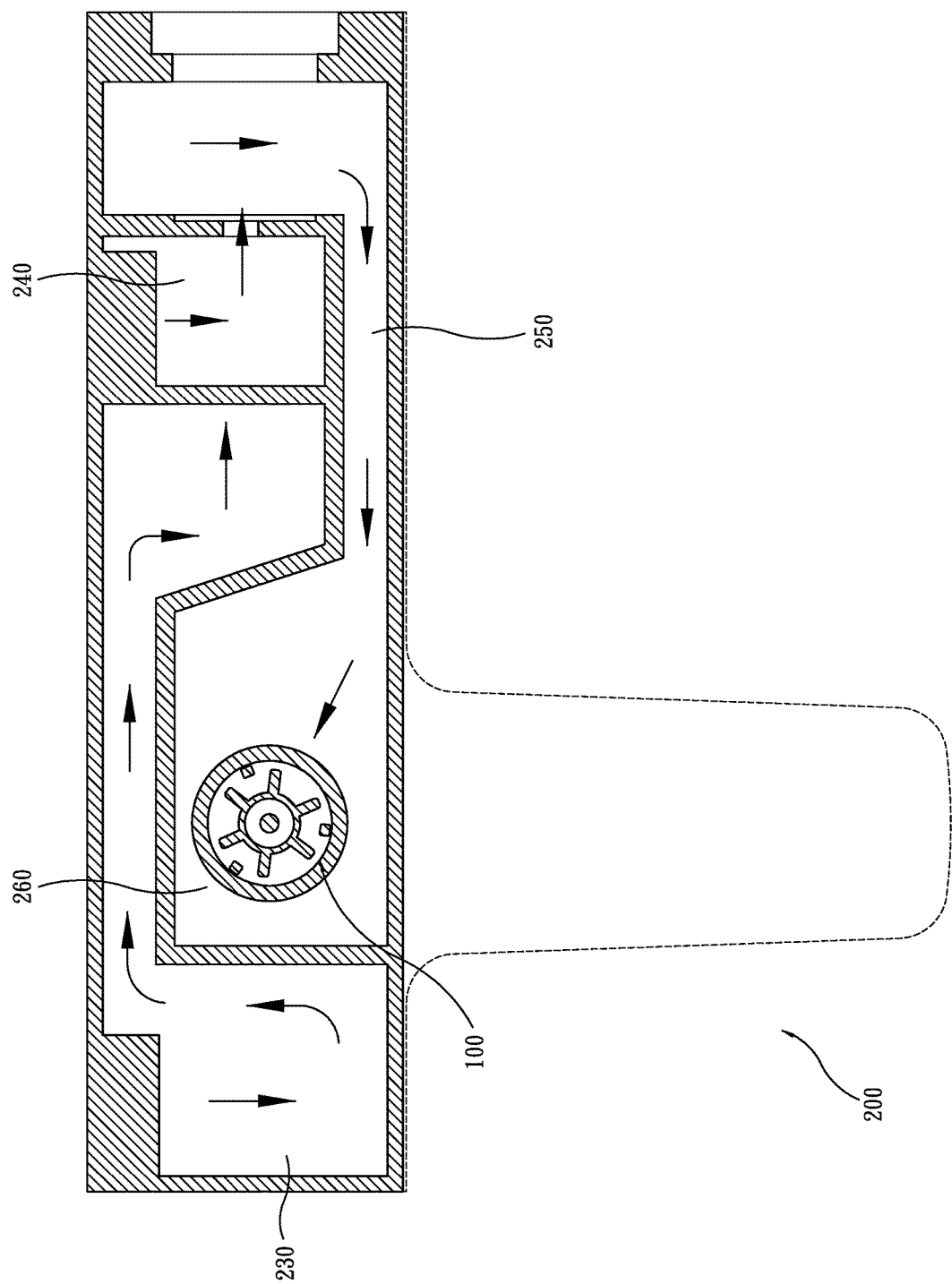
FIG. 7 is a cross-sectional view taken along line C-C of FIG. 10.
Figure 8:
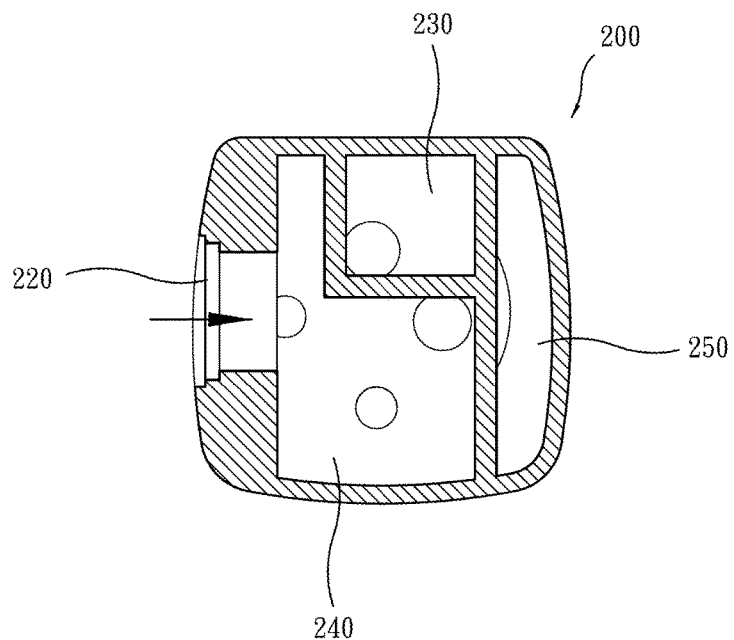
FIG. 8 is a cross-sectional view taken along line D-D of FIG. 4.
Figure 9:
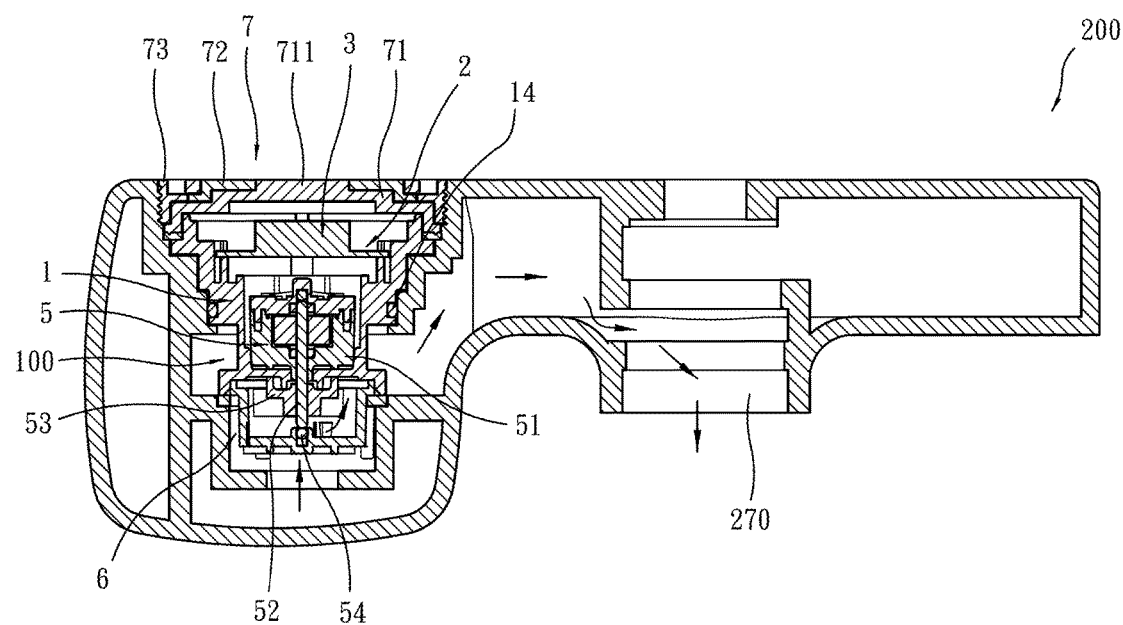
FIG. 9 is a cross-sectional view taken along line E-E of FIG. 4.
Figure 10:
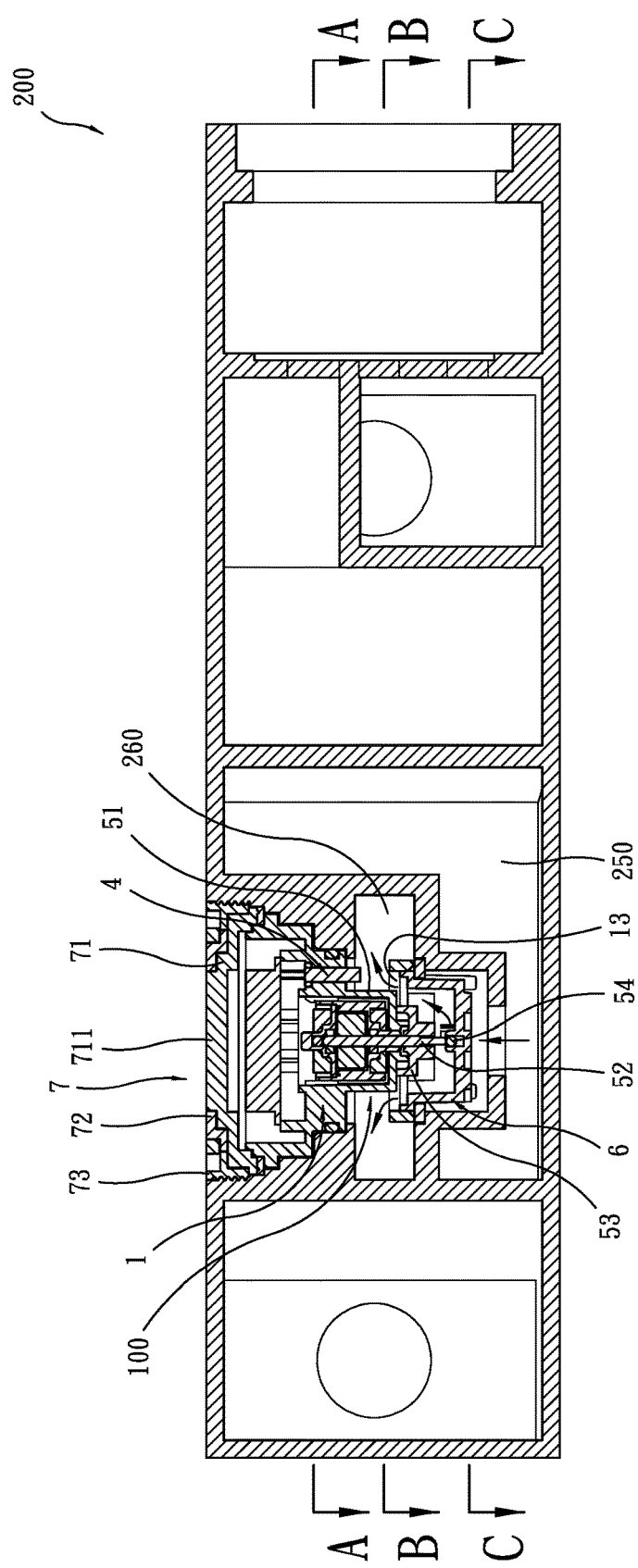
FIG. 10 is a cross-sectional view taken along line F-F of FIG. 4.
Figure 11:
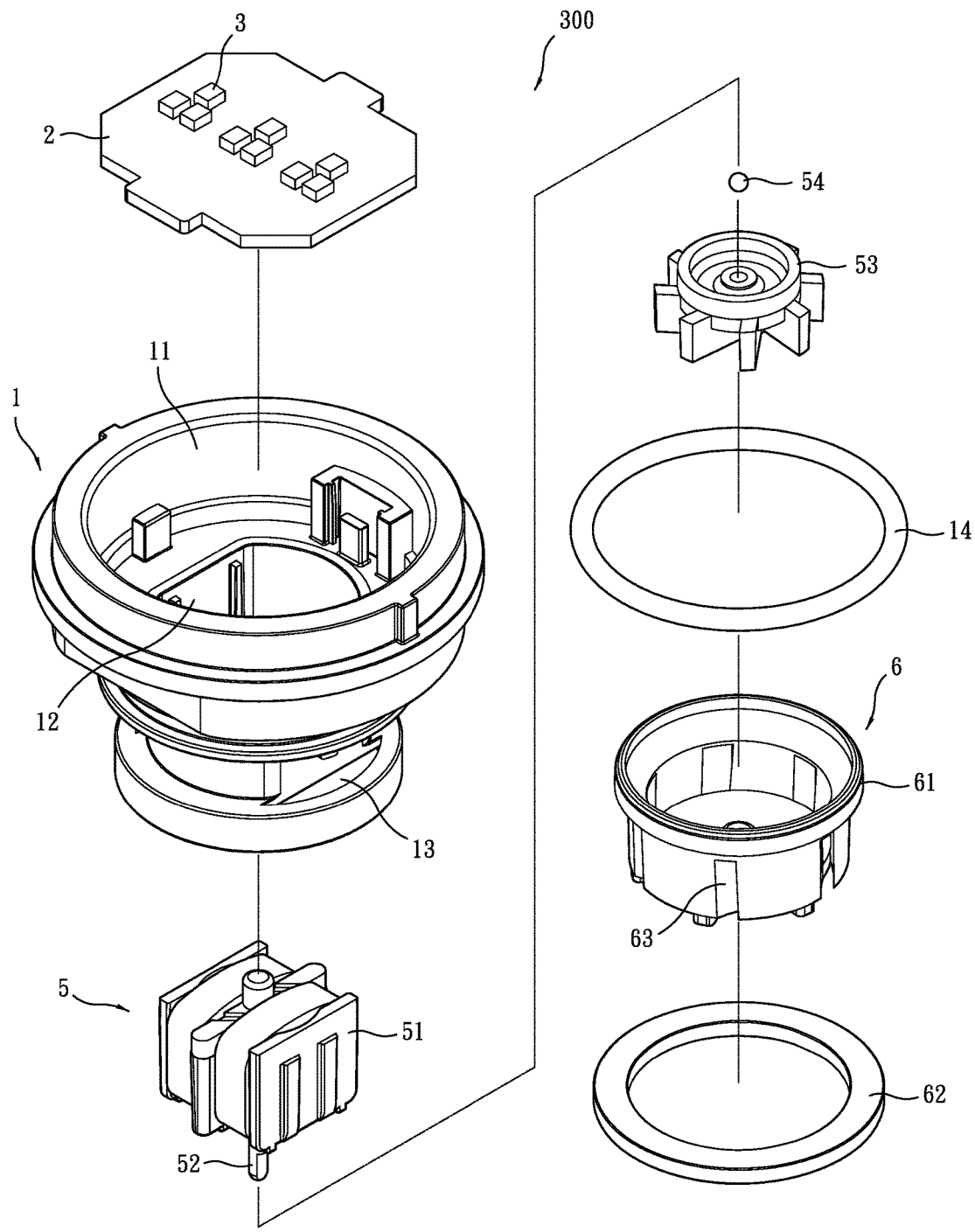
FIG. 11 is an exploded view showing a second embodiment of the present invention.
Figure 12:
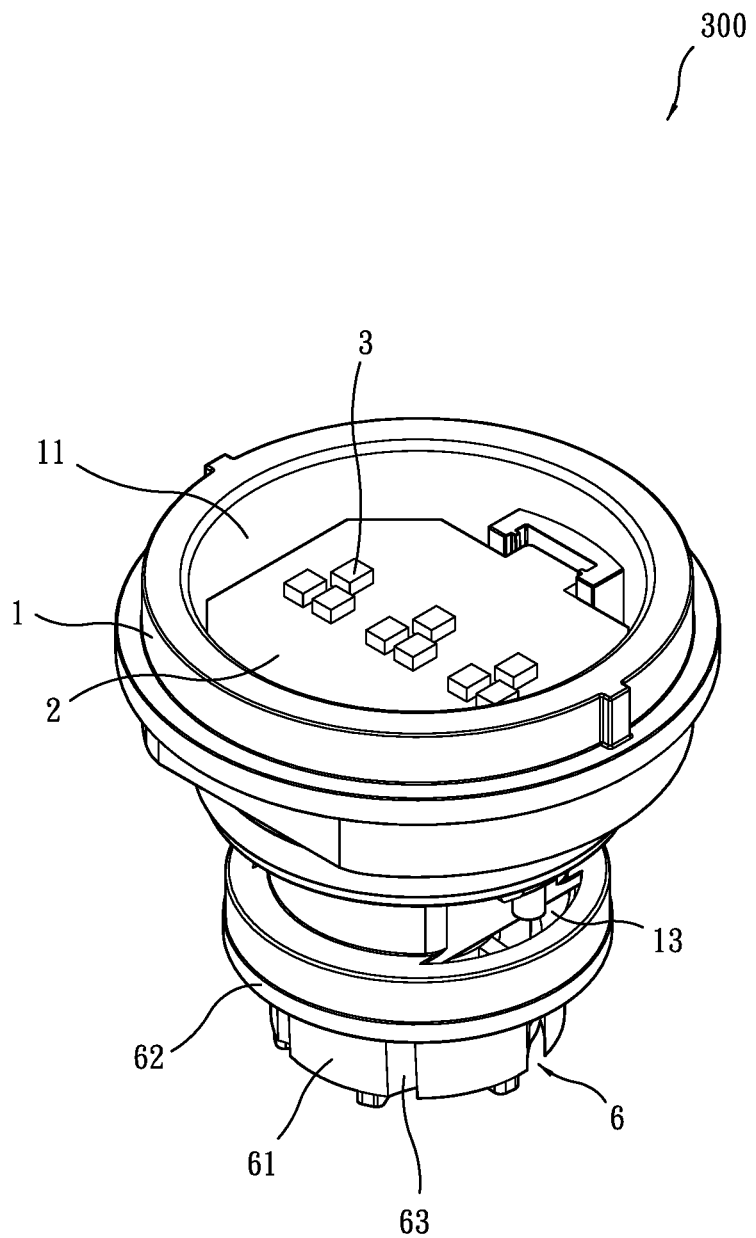
FIG. 12 is a perspective view showing the second embodiment of the present invention.
Figure 13:
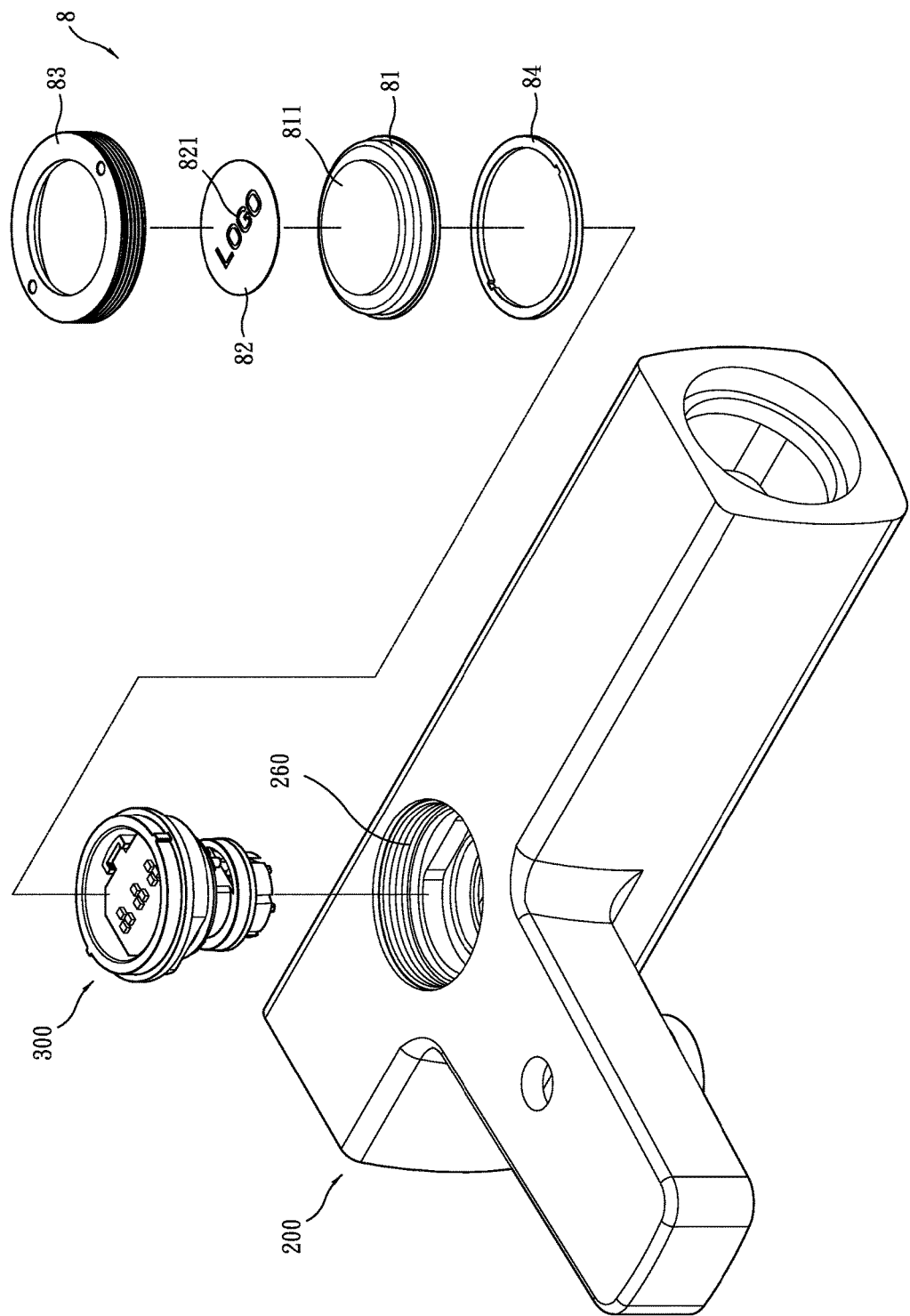
FIG. 13 is an exploded view showing the second embodiment of the present invention, in combination with a faucet.
Figure 14:
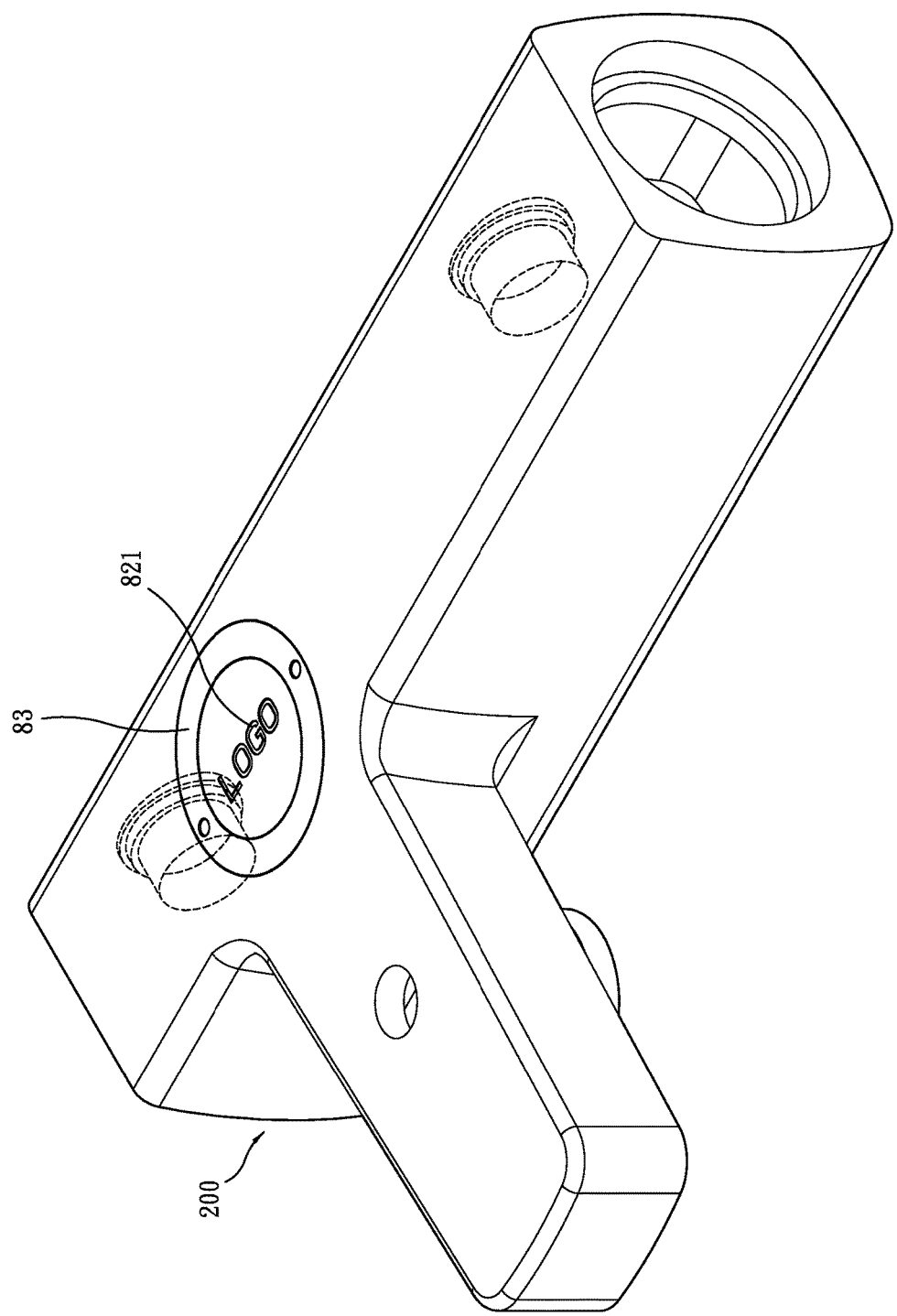
FIG. 14 is a perspective view showing the second embodiment of the present invention in combination with the faucet.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1-10, a display device 100 constructed in accordance with a first preferred embodiment of the present invention is provided for use in combination with a faucet 200 and is arranged in a water flowing section 260 of the faucet 200 to detect a temperature of mixture warm water flowing through the temperature detection zone 260. The display device 100 comprises a sealing housing 1, a circuit board 2, a display module 3, a temperature detection unit 4, a hydraulic power generation module 5, and a bottom cover 6.

The sealing housing 1 comprises, formed therein, an upper receiving space 11 and a lower receiving space 12 that are in communication with each other. The sealing housing 1 has a bottom that is formed with a discharge hole 13 extending therethrough. A sealing member 14 is fit to the bottom end of the sealing housing 1.

The circuit board 2 is arranged in the upper receiving space 11.

The display module 3 is electrically connected with the circuit board 2 and is located on the circuit board 2.

The temperature detection unit 4 is electrically connected with the circuit board 2 and is partly exposed outside the sealing housing 1.

The hydraulic power generation module 5 is arranged in the lower receiving space 12 and is electrically connected with the circuit board 2, the display module 3, and the temperature detection unit 4. The hydraulic power generation module 5 comprises a body 51, a rotary spindle 52, and a fan 53. The rotary spindle 52 is arranged to extend along a central axis of the body 51. The fan 53 has a central axle that is coupled, through a sphere 54, to a lower end of the rotary spindle 52. The fan 53 is driven by a flow of the mixture warm water to rotate so that the fan 53 drives the rotary spindle 52 and the body 51 to rotate for generation of electrical power and for supplying the electrical power to the circuit board 2, the display module 3, and the temperature detection unit 4. With the arrangement of the sealing member 14, invasion of moisture and liquid into the circuit board 2 to cause short-circuiting of the circuit board 2 could be prevented.

The bottom cover 6 is fit to the bottom of the sealing housing 1 but does not cover and block the discharge hole 13. The bottom cover 6 comprises a lower opening 63 for entry of the mixture warm water therein. The bottom cover 6 comprises a cover body 61 and a fitting ring 62. The lower opening 63 is formed in and extends through a bottom of the cover body 61. The fitting ring 62 is fit outside the cover body 61.

The display device 100 of the faucet further comprises a protection module 7, which is mounted, in a removable manner (such as screwing, but not limited thereto), to the faucet 200 at the temperature detection zone 260 to be set on and covering the sealing housing 1. The protection module 7 comprises a water-resistant lid 71, a frame cover 72, a retention cover 73, and a sealing ring 74. The water-resistant lid 71 is set on and covers the sealing housing 1 and comprises a transparent raised portion 711 having a shape and size corresponding to the display module 3 and arranged at location corresponding to the display module 3. The frame cover 72 is mounted on the water-resistant lid 71 and comprises a window 721 corresponding to the transparent raised portion 711 to receive, as being accommodated therein, projection of the transparent raised portion 711. The retention cover 73 is set on and covers the frame cover 72 and is mounted in a removable manner (such as screwing, but not limited thereto), to the faucet 200 at the temperature detection zone 260. The retention cover 73 has a configuration of a hollow ring so as to expose the transparent raised portion 711 and the window 721 and allow for observation of a temperature displayed on the display module 3. With the arrangement of the protection module 7, invasion of moisture and liquid into the temperature detection zone 260 to cause short-circuiting of the circuit board 2 could be prevented, thereby achieving an effect of water resistance.

Referring to FIGS. 5-10, the faucet 200 comprises a hot water inlet opening 210, a cold water inlet opening 220, a hot water flow channel 230, a cold water flow channel 240, a mixture warm water flow channel 250, the temperature detection zone 260, and a water outlet opening 270. The hot water inlet opening 210 is in communication with the hot water flow channel 230. The cold water inlet opening 220 is in communication with the cold water flow channel 240. The hot water flow channel 230 is isolated from the cold water flow channel 240. An end of the hot water flow channel 230 that is distant from the hot water inlet opening 210 and an end of the cold water flow channel 240 that is distant from the cold water inlet opening 220 are both in communication with the mixture warm water flow channel 250. The mixture warm water flow channel 250 is also in communication with the lower opening 63 formed in the bottom cover 6 of temperature-detection display device 100 that is arranged in the temperature detection zone 260. The mixture warm water flows through the lower opening 63 of the bottom cover 6 to be discharged through the discharge hole 13. The mixture warm water flows through a part of the temperature detection unit 4 that is located outside the sealing housing 1 of the temperature detection zone 260 so that the temperature detection unit 4 detects the temperature of the mixture warm water that is applied to the circuit board 2 for signal processing. The processed signal is transmitted from the circuit board 2 to the display module 3, so that the display module 3 may display the temperature of the water. With the above structural arrangement, the display device 100 of the present invention may display the temperature of the mixture warm water and also allows for easy removal and installation from the faucet 200. Thus, when the display device 100 gets broken, replacement can be done by a user to thereby save the cost for having a plumber to do the replacement.

Referring to FIGS. 11-14, a display device 300 for use with a faucet according to a second preferred embodiment of the present invention is provided for installation in a temperature detection zone 260 of the faucet 200, generally comprising a sealing housing 1, a circuit board 2, a display module 3, a hydraulic power generation module 5, a bottom cover 6, and a protection module 8.

The sealing housing 1 comprises, formed therein, an upper receiving space 11 and a lower receiving space 12 that are in communication with each other. The sealing housing 1 has a bottom that is formed with a discharge hole 13 extending therethrough. A sealing member 14 is fit to the bottom end of the sealing housing 1.

The circuit board 2 is arranged in the upper receiving space 11.

The display module 3 is electrically connected with the circuit board 2 and is located on the circuit board 2. In the instant embodiment, the display module 3 comprises at least one light-emitting diode (LED).

The hydraulic power generation module 5 is arranged in the lower receiving space 12 and is electrically connected with the circuit board 2 and the display module 3. The hydraulic power generation module 5 comprises a body 51, a rotary spindle 52, and a fan 53. The rotary spindle 52 is arranged to extend along a central axis of the body 51. The fan 53 has a central axle that is coupled, through a sphere 54, to a lower end of the rotary spindle 52. The fan 53 is driven by a flow of water to rotate so that the fan 53 drives the rotary spindle 52 and the body 51 to rotate for generation of electrical power and for supplying the electrical power to the circuit board 2 and the display module 3. With the arrangement of the sealing member 14, invasion of moisture and liquid into the circuit board 2 to cause short-circuiting of the circuit board 2 could be prevented.

The bottom cover 6 is fit to the bottom of the sealing housing 1 but does not cover and block the discharge hole 13. The bottom cover 6 comprises a lower opening 63 for entry of the mixture warm water therein. The bottom cover 6 comprises a cover body 61 and a fitting ring 62. The lower opening 63 is formed in and extends through a bottom of the cover body 61. The fitting ring 62 is fit outside the cover body 61.

The protection module 8 is mounted, in a removable manner (such as screwing, but not limited thereto), to the faucet 200 at the temperature detection zone 260 to be set on and covering the sealing housing 1. The protection module 8 comprises a water-resistant lid 81, a displaying section 82, a retention cover 83, and a sealing ring 84. The water-resistant lid 81 is set on and covers the sealing housing 1 and comprises a light transmitting section 811 at a location corresponding to the display module 3. The light transmitting section 811 is light transmitting. The displaying section 82 is mounted on the light transmitting section 811 of the water-resistant lid 81. In the instant embodiment, the displaying section 82 is in the form of a plate and comprises a display target 821 formed thereon. The display target 821 can be a pattern, a text, or a combination of a pattern and a text. The displaying section 82 is not light-transmitting except the display target 821 in order to achieve an effect of highlighting of the display target 821. The retention cover 83 is set on and covers the water-resistant lid 81 and is mounted, in a removable manner (such as screwing, but not limited thereto), to the faucet 200 at the temperature detection zone 260. The retention cover 83 has a configuration of a hollow ring so as to expose the display target 821 of the displaying section 82. With the arrangement of the protection module 8, invasion of moisture and liquid into the temperature detection zone 260 to cause short-circuiting of the circuit board 2 could be prevented, thereby achieving an effect of water resistance.

As such, water inside the faucet 200 flows through the lower receiving space 12 to cause the fan 53 of the hydraulic power generation module 5 drive the rotary spindle 52 and the body 51 to rotate for generating electrical power so that the electrical power is supplied to the circuit board 2 and the display module 3 to energize the display module 3 for emission of light that irradiates on the display target 821 of the displaying section 82. With the above structural arrangement, when water flows, the present invention generates electrical power with the hydraulic power generation module 5 so as to energize the display module 3 for emission of light that irradiates the display target 821 of the displaying section 82 to enhance product quality and also to highlight a logo or trade mark of the product with the display target 821 to thereby achieve an effect of enhancing the value of a trade mark.

In the above example, the display target is formed on the displaying section that is made in the form of a plate. However, the display target could be alternatively made in the forming of recessed or raised or planar printing on the light transmitting section of the water-resistant lid so as to similarly achieve the effect of being irradiated with lighting from the display module.

Figure 15:
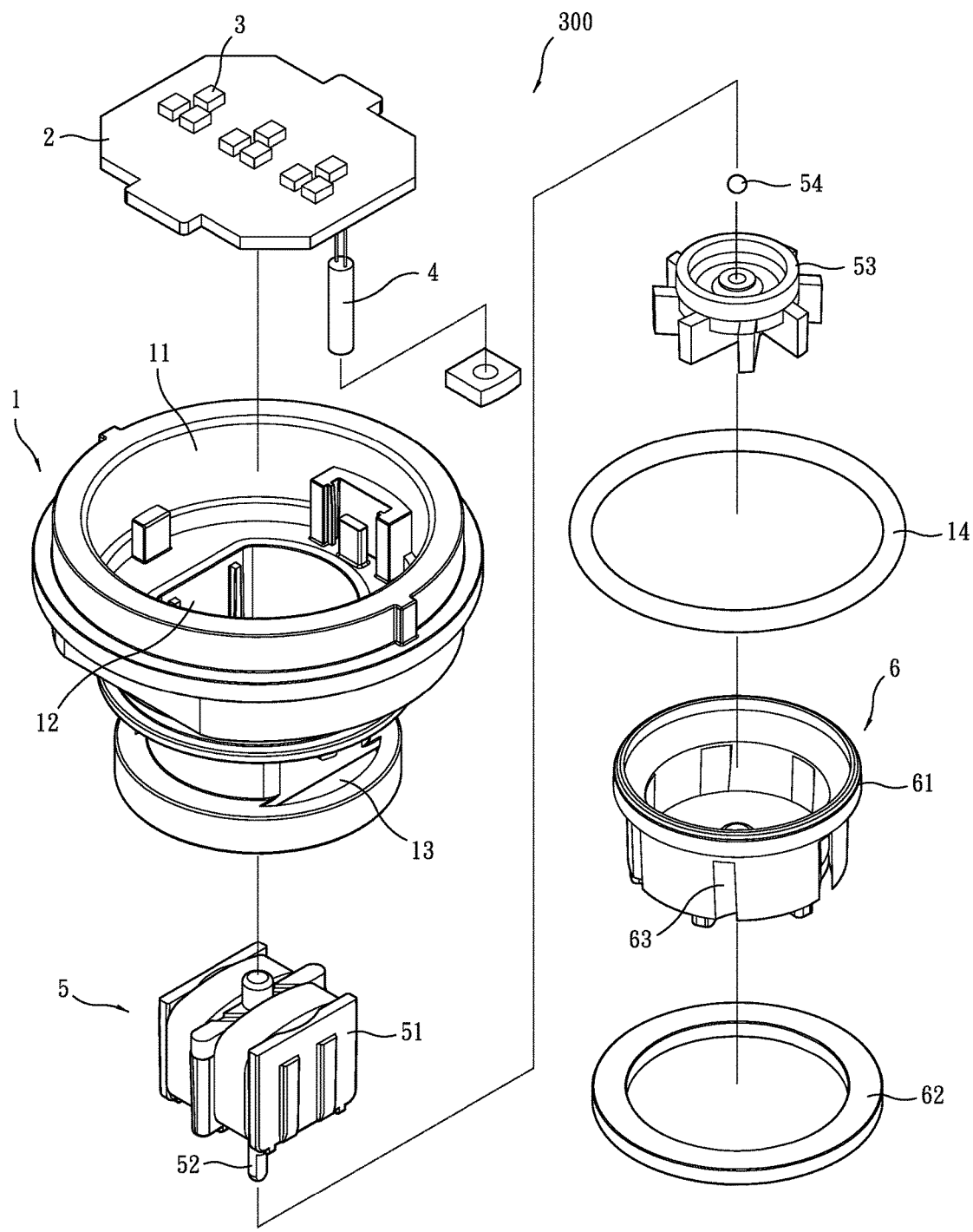
FIG. 15 is an exploded view showing a different example of the second embodiment of the present invention.

Further, as shown in FIG. 15, the display device 300 of the faucet as described above may further comprise a temperature detection unit 4. The temperature detection unit 4 is electrically connected with the circuit board 2 and is partly exposed outside the sealing housing 1. As such, the temperature detection unit 4 may conduct detection of the temperature of water flowing through the lower receiving space 12 to allow the display module 3 to emit light of different colors according to the detected temperature to provide an effect of reminding the user.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A display device for use with a faucet and adapted to arrange in a faucet at a temperature detection zone to detect a temperature of mixture wane water flowing through the temperature detection zone, the display device comprising:
    a sealing housing, which comprises, formed therein, an upper receiving space and a lower receiving space in communication with each other, the sealing housing having a bottom that is formed with a discharge hole extending therethrough;
    a circuit board, which is arranged in the upper receiving space;
    a display module, which is electrically connected with the circuit board and is located on the circuit board;
    a temperature detection unit, which is electrically connected with the circuit board and is partly exposed outside the sealing housing;
    a hydraulic power generation module, which is arranged in the lower receiving space and is electrically connected with the circuit board, the display module, and the temperature detection unit; and
    a bottom cover, which is fit to the bottom of the sealing housing in a manner of not covering the discharge hole, the bottom cover comprising a lower opening for entry of the mixture warm water.

2. The display device for use with the faucet according to claim 1, wherein the hydraulic power generation module comprises a body, a rotary spindle, and a fan, the rotary spindle being arranged to extend along a central axis of the body, the fan having a central axle that is coupled, through a sphere, to a lower end of the rotary spindle, the fan being driven by a flow of the mixture warm water to rotate so that the fan drives the rotary spindle and the body to rotate for generation of electrical power.

3. The display device for use with the faucet according to claim 1, wherein the bottom cover comprises a cover body and a fitting ring, the lower opening being formed in and extending through a bottom of the cover body, the fitting ring being fit outside the cover body.

4. The display device for use with the faucet according to claim 1, further comprising a protection module, which is mounted, in a removable manner, to the faucet to be set on and covering the sealing housing, the protection module comprising a water-resistant lid, a frame cover, a retention cover, and a sealing ring, the water-resistant lid being set on and covering the sealing housing and comprising a transparent raised portion having a shape and size corresponding to the display module and arranged at location corresponding to the display module, the frame cover being mounted on the water-resistant lid and comprising a window corresponding to the transparent raised portion to receive, as being accommodated therein, projection of the transparent raised portion, the retention cover being set on and covering the frame cover and being mounted, in a removable manner, to the faucet, the retention cover having a configuration of a hollow ring so as to expose the transparent raised portion and the window and allow for observation of the display module.

5. The display device for use with the faucet according to claim 1, wherein the faucet comprises a hot water inlet opening, a cold water inlet opening, a hot water flow channel, a cold water flow channel, a mixture warm water flow channel, the temperature detection zone, and a water outlet opening, wherein the hot water inlet opening is in communication with the hot water flow channel; the cold water inlet opening is in communication with the cold water flow channel; the hot water flow channel is isolated from the cold water flow channel; an end of the hot water flow channel that is distant from the hot water inlet opening and an end of the cold water flow channel that is distant from the cold water inlet opening are both in communication with the mixture warm water flow channel; the mixture warm water flow channel is also in communication with the lower opening formed in the bottom cover of temperature-detection display device that is arranged in the temperature detection zone; the mixture warm water flows through the lower opening of the bottom cover to be discharged through the discharge hole; the mixture warm water flows through a part of the temperature detection unit that is located outside the sealing housing of the temperature detection zone so that the temperature detection unit detects the temperature of the mixture warm water that is applied to the circuit board for signal processing; the processed signal is transmitted from the circuit board to the display module, so that the display module displays the temperature of the water.

6. A display device for use with a faucet and adapted to arrange in a faucet at a temperature detection zone, the display device comprising:
 a sealing housing, which comprises, formed therein, an upper receiving space and a lower receiving space in communication with each other, the sealing housing having a bottom that is formed with a discharge hole extending therethrough;
 a circuit board, which is arranged in the upper receiving space;
 a display module, which comprises at least one light-emitting diode and is electrically connected with the circuit board and located on the circuit board;
 a hydraulic power generation module, which is arranged in the lower receiving space and is electrically connected with the circuit board and the display module to generate electrical power as being driven by a water flow inside the temperature detection zone to supply the electrical power to energize the light-emitting diode for emission of light;
 a bottom cover, which is fit to the bottom of the sealing housing in a manner of not covering the discharge hole, the bottom cover comprising a lower opening for entry of water;
 a protection module, which comprises a water-resistant lid, the water-resistant lid being set on and covering the sealing housing and comprising a light transmitting section at a location corresponding to the display module, the light transmitting section being light transmitting, the light transmitting section comprising a display target formed thereon such that the display target is irradiated by lighting from the light emitting diode.

7. The display device for use with the faucet according to claim 6, wherein the hydraulic power generation module comprises a body, a rotary spindle, and a fan, the rotary spindle being arranged to extend along a central axis of the body, the fan having a central axle that is coupled, through a sphere, to a lower end of the rotary spindle, the fan being driven by a flow of the mixture warm water to rotate so that the fan drives the rotary spindle and the body to rotate for generation of electrical power.

8. The display device for use with the faucet according to claim 6, wherein the bottom cover comprises a cover body and a fitting ring, the lower opening being formed in and extending through a bottom of the cover body, the fitting ring being fit outside the cover body.

9. The display device for use with the faucet according to claim 6, wherein the protection module further comprises a displaying section and a retention cover, the displaying section being in the form of a plate mounted on the light transmitting section of the water-resistant lid, the display target being formed on the displaying section, the retention cover being set on and covering the water-resistant lid and being mounted, in a removable manner, to the faucet at the temperature detection zone, the retention cover having a configuration of a hollow ring so as to expose the display target.

10. The display device for use with the faucet according to claim 6, wherein the display target comprises one of a pattern, a text, and a combination of a pattern and a text.

11. The display device for use with the faucet according to claim 6, further comprising a temperature detection unit, the temperature detection unit being electrically connected with the circuit board and partly exposed outside the sealing housing, the temperature detection unit being operable to detect a temperature of water flowing through the lower receiving space to allow the display module to emit light of different colors according to the detected temperature.

* * * * *